Nov. 29, 1927.
L. W. THOMPSON
1,650,664

FLOW METER

Filed Oct. 7, 1924    3 Sheets-Sheet 1

Inventor:
Louis W. Thompson,
by Alexander S. [illegible]
His Attorney.

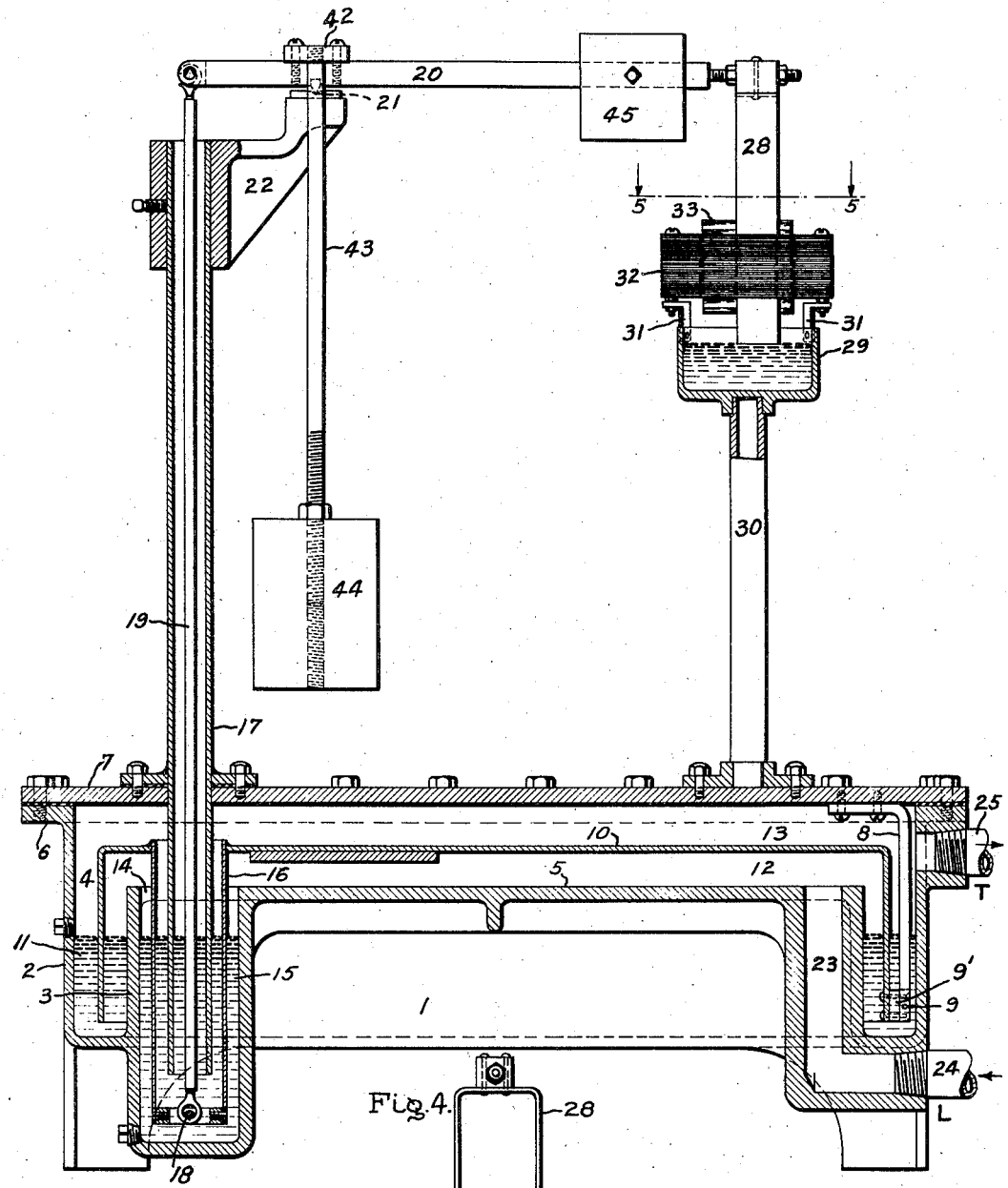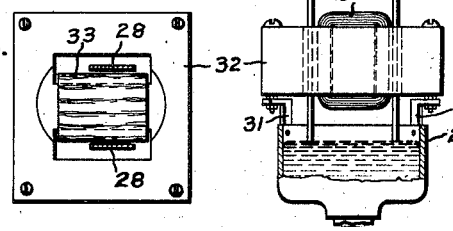

Nov. 29, 1927. 1,650,664
L. W. THOMPSON
FLOW METER
Filed Oct. 7, 1924  3 Sheets-Sheet 3

Inventor:
Louis W. Thompson,
by *Alexander S. Lunt*
His Attorney.

Patented Nov. 29, 1927.

1,650,664

UNITED STATES PATENT OFFICE.

LOUIS W. THOMPSON, OF SCHENECTADY, NEW YORK, ASSIGNOR, BY MESNE ASSIGNMENTS, TO BAILEY METER COMPANY, A CORPORATION OF DELAWARE.

FLOW METER.

Application filed October 7, 1924. Serial No. 742,219.

The present invention relates to flow meters for measuring flow of fluids through conduits and has for its object to provide an improved flow meter which is well adapted for measuring flows of low velocity although it is not necessarily limited thereto.

For a consideration of what I believe to be novel and my invention, attention is directed to the accompanying description and the claims appended thereto.

Figure 1:
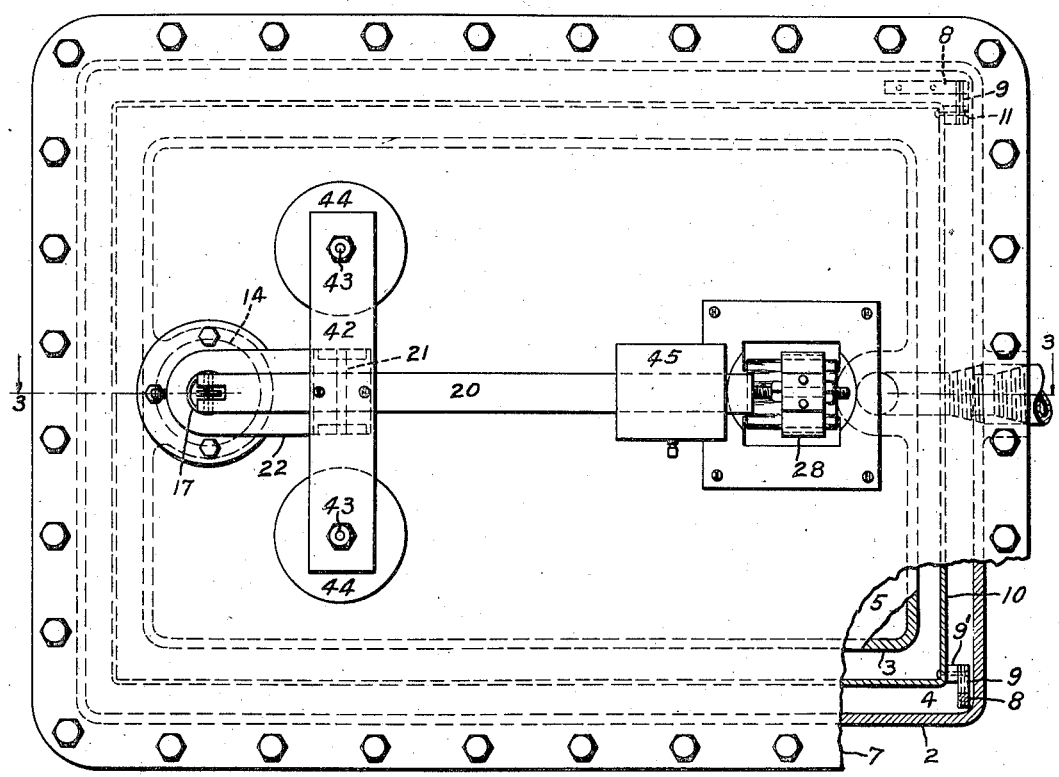
Figure 2:
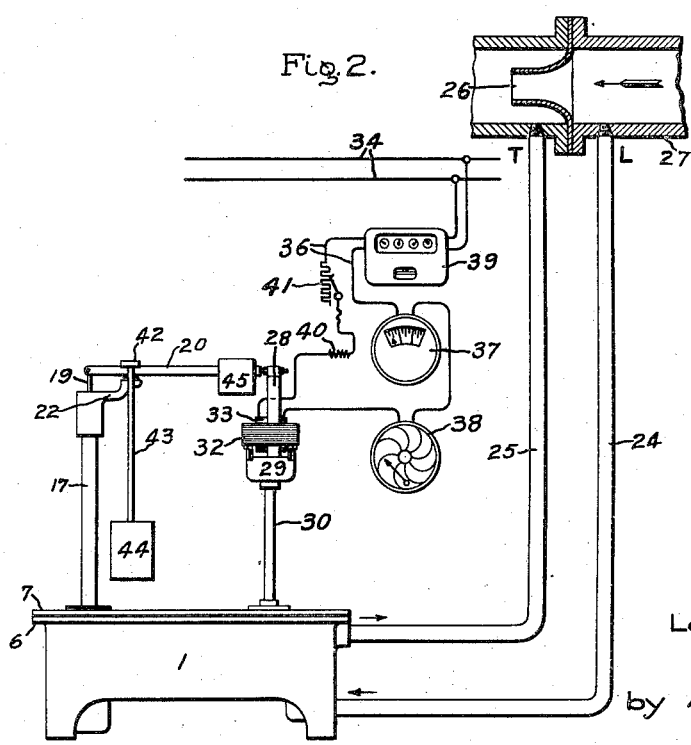
Figure 6:
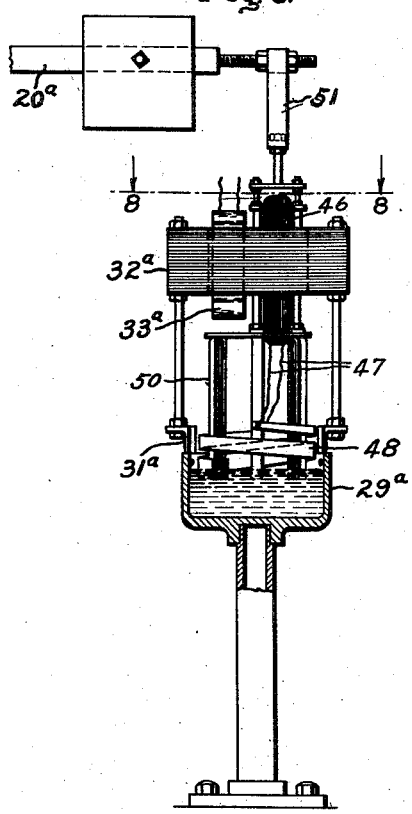
Figure 7:
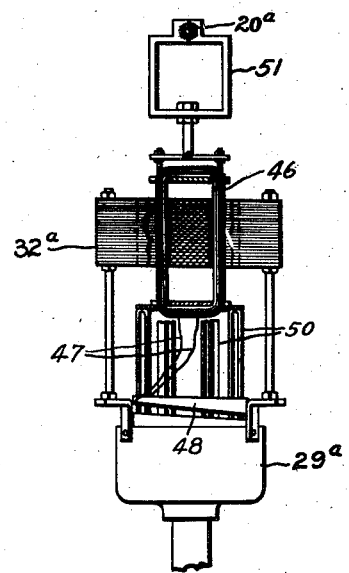
Figure 8:
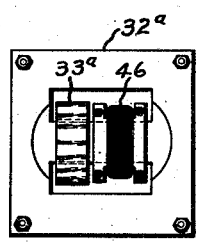
Figure 9:
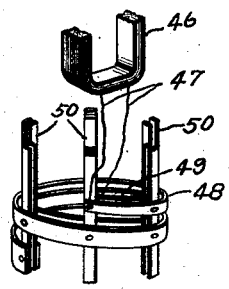

In the drawings, Fig. 1 is a plan view of a flow meter embodying my invention; Fig. 2 is a diagrammatic view of the same in side elevation; Fig. 3 is a vertical sectional view taken on line 3—3, Fig. 1; Fig. 4 is a detail view, partly in section, of certain parts; Fig. 5 is a sectional plan view taken on line 5—5, Fig. 3; Fig. 6 is a detail view, partly in section, of a modification; Fig. 7 is a view, partly in section, taken at a right angle to Fig. 6; Fig. 8 is a top plan view taken on line 8—8, Fig. 6; and Fig. 9 is a detail perspective view.

Referring to the drawings, Figs. 1 to 5 inclusive, 1 indicates a base which may be rectangular or of other suitable shape, and which is provided with walls 2 and 3 which define a surrounding sealing chamber 4. The upper edges of walls 3 are formed integral with a bottom plate 5. Walls 2 project above walls 3 and are provided with flanges 6 to which is bolted a cover plate 7. Attached to the underside of cover plate 7 at one of its ends are two depending arms 8, one at each corner. At their lower ends arms 8 are provided with pintles 9 on which an inverted bell 10 is pivoted by means of hinge members 9'. The side walls of bell 10 are located in sealing chamber 4 and are sealed by means of a suitable liquid 11 such as mercury, contained in chamber 4. Bell 10 serves to divide the casing into two chambers, a leading pressure chamber 12 and a trailing pressure chamber 13.

At the end of base 1 opposite that at which bell 10 is hinged is a well 14 containing a sealing liquid 15 such as mercury. Depending into well 14 is a sleeve 16 which is attached at its upper end to bell 10 and communicates with trailing pressure chamber 13. Sleeve 16 is smaller in diameter than well 14 and terminates near the bottom of the well. Inside sleeve 16 and in spaced relation to it is a tube 17 which is attached to cover plate 7 and projects through it. Attached to the lower end of sleeve 16 is a knife edge bearing 18 on which is hinged the lower end of a rod 19. Rod 19 projects out through tube 17 and at its upper end is hinged to one end of a lever 20 fulcrumed at 21 on a bracket arm 22 which is carried by the upper end of tube 17.

Communicating with leading pressure chamber 12 through a passage 23 is a leading pressure pipe 24 and communicating with trailing pressure chamber 13 is a trailing pressure pipe 25. Pipes 24 and 25 lead to the two sides of a pressure difference creating device 26 located in a conduit 27 through which the fluid to be metered flows. By way of example, a pressure difference creating device in the form of a flow tube is illustrated.

With the above described arrangement, it will be seen that bell 10 is subjected on its inside to the leading pressure and on its outside to the trailing pressure, and that these pressures are confined to their respective pressure chambers 12 and 13 by the sealing liquid 11 in chamber 4 and the sealing liquid 15 in well 14. The purpose of well 14 and the parts therein is to form a liquid seal through which rod 19 is connected to bell 10.

Connected to the end of lever 20 remote from rod 19 is a U-shaped strip 28 arranged with its open end facing downwardly and formed of a suitable material, such as copper, which is a conductor of electricity. Directly adjacent the lower end of strip 28 is a cup 29 supported on a post 30 and containing a supply of liquid such as mercury, which is a conductor of electricity. Supported by brackets 31 on cup 29 is a laminated transformer core 32 comprising three legs, and on the middle leg is a primary transformer winding 33. The two arms of U-shaped strip 28 pass down on opposite sides of winding 33 as is best shown in Fig. 5, and when their lower ends dip into the liquid in cup 29 there is formed a closed loop or winding of one turn which forms a secondary winding for the transformer. The resistance of this closed loop is the resistance of the U-shaped strip 28 plus the resistance of the liquid between the ends of the arms of the U-shaped strip. The major portion of the resistance is that of the liquid, the strip 28 being of low resistance. Primary transformer winding 33 is connected to a source of alternating current supply 34, and in the circuit connections which are indicated at 36 are suitable electrical measuring instruments such as an indicating ammeter 37, a curve drawing ammeter 38 and an integrating watt hour meter 39. In circuit connections 36 is a fixed resistance 40 and an adjustable resistance 41.

Connected to lever 20 at its fulcrum point is a cross arm 42 from which depends two rods 43 which carry adjustable opposing or counterbalancing weights 44 at their lower ends. Also on lever 20 is an adjustable balancing weight 45.

In use, the weight 45 is set on lever 20 in a position such that it just balances the parts attached to the left hand end of the lever and holds the lever horizontal. Rods 43 are then vertical and since they are located in line with fulcrum 21 they exert no turning force on lever 20. Cup 29 is filled with conducting liquid, such as mercury, to a point just below the lower ends of the U-shaped strip 28. The secondary loop or winding of the transformer comprising core 32 is thus open and there will be practically no current flowing in the primary winding and the circuit connected thereto. This represents a condition of no flow of fluid to be metered, and the measuring instruments will be suitably compensated and calibrated so that the indicating instruments read zero and the watt hour meter is stationary.

Now, when flow takes place through conduit 27, the pressure difference created by flow tube 26 acts on bell 10 and serves to raise the left hand end of it, the right hand lower edge turning on pintles 9. This effects a turning of lever 21 on its fulcrum in a clockwise direction, the movement continuing until the counter-balancing weights 44 balance the differential pressure applied to bell 10. The turning of lever 21 serves to bring the lower ends of the arms of strip 28 into the liquid in cup 29, thereby forming a closed secondary winding of one loop or turn. This will cause a flow of current in primary winding 33 and the circuit connected to it proportional to the resistance of the closed secondary loop, and this in turn will depend upon the extent to which the ends of the arms of strip 28 are submerged in the liquid in cup 29, the resistance decreasing and the flow of current increasing as the arms are submerged deeper and deeper, because of the increase in the cross sectional area of the liquid path between the arms. The extent to which the arms of strip 28 are submerged increases with the flow through conduit 27 because of the increase in the pressure difference created by flow tube 26, and since the current flowing in primary winding 33, and hence in the indicating circuit 36, varies with the extent to which the arms are submerged, it follows that such current varies with the flow through conduit 27, and hence becomes a measure of the flow through conduit 27. As is well known, the flow of fluid in a conduit is proportional to the square root of the pressure difference created by a pressure difference creating device, and I have found that by properly proportioning the parts which go to make up the transformer comprising core 32, and by providing a resistance in the circuit connected to transformer winding 33 of suitable value, (things which can be determined experimentally) the current produced in such primary winding will be proportional to the square root of the pressure difference also. As a result, the current flowing in the indicating circuit 36 will vary directly with the flow of fluid through conduit 27, and hence may be integrated in terms of flow by an integrating watt hour meter. It will be understood that for integrating the flow on an integrating watt hour meter it is necessary that the current produced should vary directly with the flow. However, if it is not required to integrate the flow, then the mechanism need not necessarily be made to give this relation but may be otherwise proportioned and suitably calibrated.

In Figs. 6, 7, 8 and 9, I have shown a modification of my invention wherein the secondary winding or loop is in the form of a rectangular coil 46, the terminals 47 of which are connected to two spaced conductors 48 and 49 of suitable resistance material coiled on a frame 50 which is attached to and depends from the lower end of soil 46. Frame 50 is formed of suitable insulating material so that conductors 48 and 49 are insulated one from the other, one being located inside the frame and the other outside the frame as is clearly shown in Fig. 9. Coil 46 surrounds the middle leg of the transformer core 32$^a$ and can be moved vertically relatively thereto as will be seen from Fig. 7. It is attached to the end of lever 20$^a$, which corresponds to lever 20 of Figs. 1 to 5, by a frame 51, and is lowered and raised by the lever. Directly beneath frame 50 is the cup 29$^a$, corresponding to cup 29 of Figs. 1 to 5, containing a liquid, such as mercury, into which the conductors 48 and 49 may be lowered. The primary winding, corresponding to primary winding 33 of Figs. 1 to 5, is indicated at 33$^a$ and the supporting brackets for it and the core 32$^a$ are indicated at 31$^a$. Otherwise, the arrangement shown in Figs. 6 to 9 is the same as that shown in Figs. 1 to 5 and operates in the same general way, lever 20$^a$ being lowered and raised in accordance with changes in the differential pressure created by the pressure difference creating device. The indicating circuit for primary transformer winding 33$^a$ is not shown in connection with Figs. 6 to 9, it being the same as that shown in connection with Fig. 2.

With this modification, as secondary winding 46 is lowered and raised in accordance with the flow of fluid to be measured the conductors 48 and 49, which form a resistance in circuit with secondary winding 46, are gradually cut out of and into circuit by the liquid in cup 29ª, thereby varying the resistance of secondary winding 46 and, hence, the current flowing in it. The purpose of utilizing two conductors 48 and 49 is to vary the resistance with the desired degree of rapidity and in this connection it will be understood that only a single conductor need be used if found desirable. The essential thing is that the resistance of the closed secondary loop or winding be varied with the desired degree of rapidity as lever 20ª moves and other suitable arrangements may be used to accomplish this result.

It is to be understood, furthermore, that as to certain aspects my invention is not limited to flow meters but may be used to measure any pressure or pressure difference or any quantity which such pressure or pressure difference represents or any movement which is proportional to some variable whether or not produced by a pressure or pressure difference.

In connection with the two modifications illustrated, it will be noted in the case of the construction shown in Figs. 1 to 5, inclusive, that the U-shaped strip 28 has but little electrical resistance and that the main drop in potential takes place across the liquid between the two arms of the U-shaped strip. In other words, the resistance is varied primarily by varying the cross sectional area of the path through the liquid. On the other hand, in the case of the construction shown in Figs. 6 to 9, inclusive, the resistance is varied primarily by submerging the resistance strips 48 and 49 in the liquid to different depths thereby gradually cutting the resistance strips into and out of circuit. Either of these methods or a combination of the two may be used, the essential thing being to vary the electrical resistance of the closed secondary loop or winding.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. In a measuring instrument of the character described, the combination of a transformer core having a middle leg, a primary winding on said leg, a container over which the core is mounted, a conducting liquid in the container, a secondary winding on said middle leg, said winding being movable transversely of the leg in the direction of the container and having spaced terminal ends adapted to be variably submerged in the liquid in the container when said secondary winding is moved in said direction, an indicating circuit connected with the primary winding, and means connected with the secondary winding for moving it in accordance with the magnitude of a quantity to be measured.

2. In a measuring instrument of the character described, the combination of a transformer core, a primary winding thereon, an indicating circuit connected with the primary winding, a container over which the core is mounted, a conducting liquid in the container, a movable secondary winding on said core comprising two spaced conducting members which depend below the core into the container, and means connected with the secondary winding for moving it to submerge the conducting members in the liquid to a degree corresponding to the magnitude of a quantity to be measured.

In witness whereof, I have hereunto set my hand this 4th day of October, 1924.

LOUIS W. THOMPSON.